United States Patent [19]

Tahara et al.

[11] Patent Number: 5,666,211
[45] Date of Patent: Sep. 9, 1997

[54] FACSIMILE APPARATUS HAVING MEANS FOR RECORDING AND REPRODUCING TO AND FROM AN OPTICAL DISK

[75] Inventors: Tomonori Tahara; Akira Uchida, both of Kanagawa, Japan

[73] Assignee: Sony Corporation, Tokyo, Japan

[21] Appl. No.: 240,611

[22] Filed: May 11, 1994

[30] Foreign Application Priority Data

May 18, 1993 [JP] Japan .................. 5-116163

[51] Int. Cl.$^6$ .................................. H04N 1/21
[52] U.S. Cl. ................ 358/404; 358/403; 358/444
[58] Field of Search .................. 358/403, 404, 358/442, 444, 468, 407; 379/100; 395/114, 164; H04N 1/32, 1/21

[56] References Cited

U.S. PATENT DOCUMENTS

| 5,038,226 | 8/1991 | Nagaishi | 358/468 |
| 5,055,945 | 10/1991 | Oguma et al. | 358/468 |
| 5,216,520 | 6/1993 | Omura et al. | 358/468 |
| 5,321,831 | 6/1994 | Hirose . | |
| 5,339,169 | 8/1994 | Meguro et al. | 358/404 |
| 5,396,341 | 3/1995 | Takahashi et al. | 358/404 |

*Primary Examiner*—Kim Vu
*Attorney, Agent, or Firm*—William S. Frommer; Alvin Sinderbrand

[57] ABSTRACT

A facsimile apparatus, copier, or other image processing apparatus superior in handling of paperless documents and able to store a large volume of image data, using as a means of storing the image data a small-sized, interchangeable optical disk storage medium known as a "mini-disk". In the case of a facsimile apparatus, a document reader reads the content of the document for transmission as image data, a signal processor compresses the image data and stores it on an optical disk cassette through an optical disk drive. The image compressed data stored in the optical disk cassette may be immediately sent to the destination facsimile apparatus through a modem and line controller or may be sent at a date and time designated for preset transmission. Further, the image data received through the line controller and modem may be printed by a printer or stored in an optical disk cassette.

23 Claims, 5 Drawing Sheets

FACSIMILE APPARATUS HAVING MEANS FOR RECORDING AND REPRODUCING TO AND FROM AN OPTICAL DISK

BACKGROUND OF THE INVENTION

1. Field of the Invention

The present invention relates to a facsimile apparatus, copier, or other image data processing apparatus using an optical disk recording medium and a method of data transmission and method of data reproduction in a facsimile apparatus.

2. Description of the Related Art

One known type of facsimile apparatus is the facsimile apparatus called the storage-type facsimile apparatus.

In such a storage-type facsimile apparatus, the content is read from the document to be transmitted, the image data to be transmitted is compressed and stored once in a memory, then immediately after storage or at a designated time after storage, the stored compressed image data for transmission is sent as a "preset transmission".

Such a storage-type facsimile apparatus usually includes a semiconductor memory, for example, a dynamic random access memory (DRAM). When a DRAM is used, however, there are limits to the capacity of the data which can be stored. Usually, if the amount of the data to be transmitted becomes too large, it is sent divided into several transmission sessions. For example, assuming the amount of data of an A4 size (296 mm×210 mm) document to be 50 KB and use made of a 1 MB DRAM, the number of pages which can be stored at one time would just be about 20 pages. Accordingly, in a storage-type facsimile apparatus, an A4 size document of 50 or 100 pages would be divided and sent over several transmission sessions.

If divided for transmission, one stored portion of the image data would be sent out, then the next portion would be stored and therefore the telephone link released, so when trying to send the next portion of the image data, another facsimile apparatus might intervene and send its own transmission to the destination facsimile apparatus, so the problem would arise of the desired content of the transmission not being consecutively received by the other party. As a result, there would be the trouble of separating the results received at the destination facsimile apparatus due to the reception of several transmissions from other facsimile apparatuses at the destination facsimile apparatus.

When performing "preset transmission" for storing documents for transmission in a storage-type facsimile apparatus and transmitting them at a designated later time, it is necessary to store the entire content of the document at one time, but if the document contains too many pages, the problem is encountered of an inability to perform "preset transmission" due to the limits of the storage capacity.

Further, when the facsimile paper has run out and the image data received cannot be printed out, one method used is to store the data in the memory built into the facsimile apparatus as "automatic alternate reception", but in this case too the problem is encountered of the alternate reception not being able to be completely carried out due to limitations in the memory capacity if the number of pages received becomes too large.

In this case, the sender has to be asked to retransmit, which is both time consuming and bothersome to the other party. In particularly, when receiving a transmission from another country, the troublesome work of asking for retransmission to the foreign sender becomes necessary.

On the other hand, there has been proposed a facsimile apparatus which has a memory built into it, stores the compressed image data it receives in the memory once, then displays the image data once on a display apparatus instead of constantly printing it out, so does not print out or record received information of a transitory nature, but prints out only information which the receiver wishes to record and keep (for example, in Japanese Unexamined Patent Publication (Kokai) No. 2-231868).

With such a facsimile apparatus, there is the advantage that received information of a transitory nature can be checked on the display without being printed out, plus, like in the past, it is possible to print out a hard copy of information desired to be kept as a record.

There are currently already known copiers which record the copied information on removable floppy disks. That is, the method of paperless storage of the content of documents is known in the field of copiers.

Like with copiers, it would be convenient for facsimile apparatuses to be able to record the received information on floppy disks or other removable recording media, but this has not yet been proposed for facsimile apparatuses.

One method which may be considered for solving the problem of the limited memory capacity mentioned above is to increase the capacity of the memory built into the facsimile apparatus. The memory capacities of semiconductor memories, for example, DRAM's, have grown tremendously and these devices have become low in price as well.

When image processing and compressing the content of A4 size documents, however, a memory capacity of 50 KB or so is required for an A4 size page. Considering the trend toward paperless documents mentioned above and assuming a memory capacity able to store 2000 A4 size pages of documents per month, the memory capacity would become 100 MB. It is not practical economically, however, to mount a DRAM of a capacity of as much as 128 MB. Further, DRAM's are not suited to removal from facsimile apparatuses, which is a requirement in the trend toward paperless documents.

If facsimile apparatuses, like copiers, are provided with removable floppy disks, it would be possible for them to store the contents of documents without paper and also the received image data could be reproduced at any time using not only the facsimile apparatus receiving it, but other facsimile apparatuses or new image data reproduction apparatuses.

Floppy disks, however, have a capacity of at most 1 to 2 MB at the present time. Like with semiconductor memories, if the received data becomes very large, it cannot be accommodated on a single floppy disk, making insertion of another floppy disk necessary.

Usually, a human operator has to exchange the floppy disks, which complicates the work. Of course, it is possible to install a number of floppy disk drives in a facsimile apparatus, but this is not practical. At the same time, consideration may be given to an automatically exchanging floppy disk drive, but it is not realistic to mount such a complicated piece of apparatus in a facsimile apparatus.

There is the possibility of using a hard disk with a capacity of for example 100 MB or 200 MB in place of a semiconductor memory or floppy disk. Usually, however, a hard disk is used built in to an apparatus and not removable from the same. Of course, removable hard disks are known, but these hard disks are limited and high in price and there it is not practical to use hard disks for facsimile apparatuses, copiers, etc.

One means for increasing the storage capacity and realizing interchangeability is to make use of magnetic recording medium such as cassette tapes which can continuously record and reproduce information, but such magnetic recording medium are not random access memories, so there is the problem that time is taken to retrieve the desired information.

Sometimes it is desired to send the same transmission to several parties, for example, several branches. With the currently known facsimile apparatuses, it is necessary to set the document for transmission in the facsimile apparatus and go through the transmission procedures for each destination, so the work efficiency is poor.

In this way, the current facsimile apparatuses and copiers and other image data processing apparatuses have had problems in the limited storage capacity and interchangeability.

SUMMARY OF THE INVENTION

Accordingly, the object of the present invention is to provide a facsimile apparatus, copier, or other image data processing apparatus which can store a large number of documents at a low price and with interchangeability of storage media.

Another object of the present invention is to provide a facsimile apparatus, copier, or other image data processing apparatus which makes use of the features of interchangeability and large data storage capacity to make possible new forms of use.

Recently, optical disk cassettes of a small size of about 2.5 inches and having large storage capacities of over 150 MB, called "mini-disks (MD, trade-name) have come into use mainly for the recordal and reproduction of audio signals.

The inventors of this application took note of the fact that such optical disk cassettes are interchangeable and have storage capacities of about 150 MB and therefore have discovered that small-sized optical disks are perfect for use for recordal of large amounts of image data or document data. That is, such optical disk cassettes are interchangeable, low in price, and, on top of this, have an equal level of storage capacity as hard disks.

The present inventors have made use of optical disks with such advantages as the storage media for facsimile apparatuses, copiers, and other image data processing apparatuses.

Further, the present inventors have utilized the size of the storage capacity of optical disk cassettes to add new functions not realized in the past to facsimile apparatuses.

Since use is made of an optical disk medium with a large storage capacity, it is possible to store image data sent from a facsimile apparatus or received by a facsimile apparatus without restriction as to capacity.

Further, since use is made of an optical recording medium which is small in size, it is possible to easily build the optical disk medium into the facsimile apparatus or other image data processing apparatuses.

Also, since use is made of an optical recording medium which is interchangeable, for example, it is possible to store image data in the optical disk medium in advance by another facsimile apparatus other than the transmission facsimile apparatus, a copier, or other image data processing apparatus, etc. and then later load that optical disk medium into a transmission facsimile apparatus and send out that data.

In the same way, when image compressed data is received by one facsimile apparatus, it is possible to reproduce the received image compressed data at another facsimile apparatus, copier, or other image data processing apparatus in addition to the receiving facsimile apparatus.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
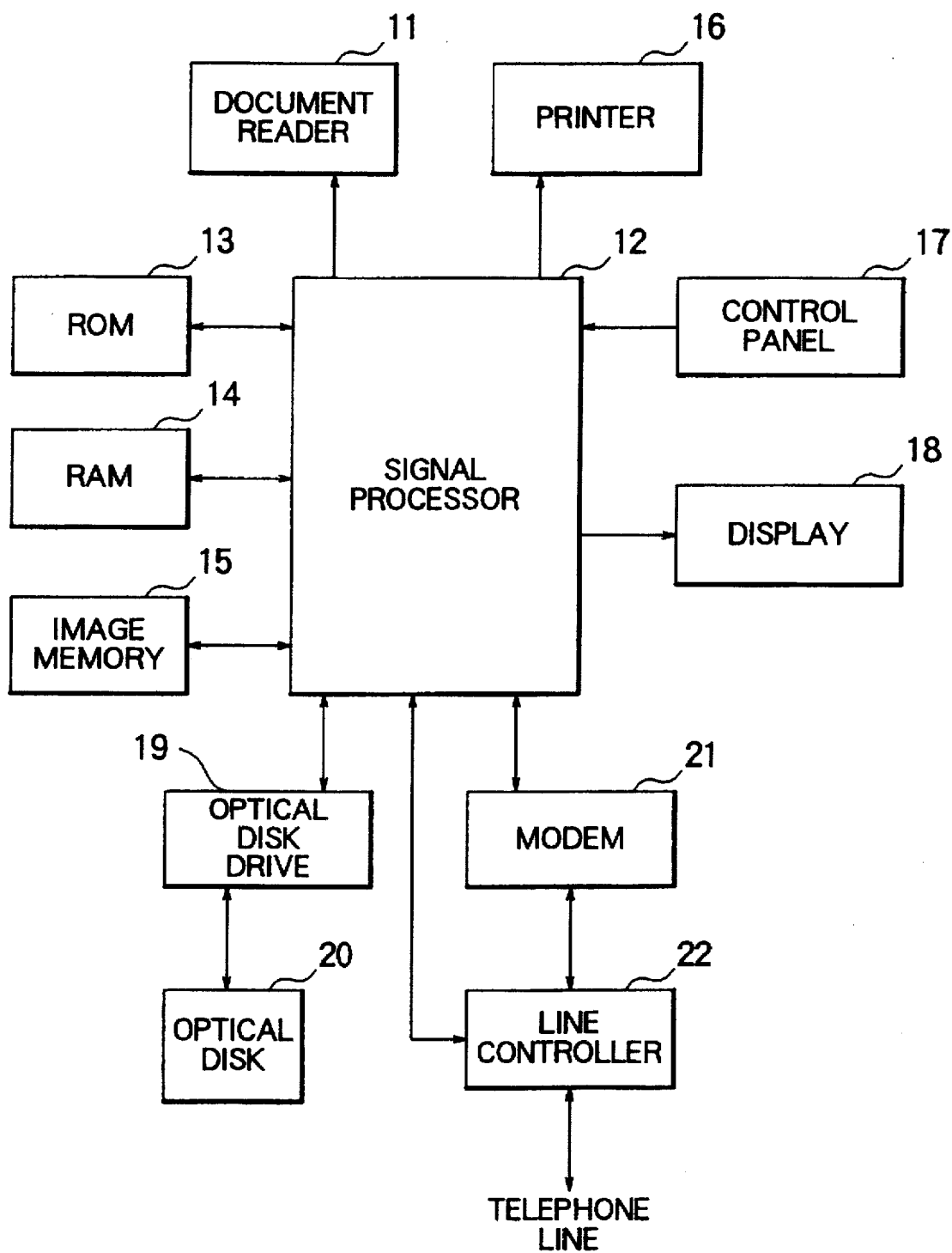
FIG. 1 is a view of the configuration of a facsimile apparatus of an embodiment of the present invention.

FIG. 1 is a view of the configuration of a facsimile apparatus according to one embodiment of the present invention.

The illustrated facsimile apparatus is provided with a document reader 11, a signal processor 12, a read only memory (ROM) 13, a random access memory (RAM) 14, an image memory 15, a printer 16, a control panel 17, a display 18, an optical disk drive 19, an optical disk cassette 20 serving as the optical disk recording medium, a modem 21, and a line controller 22. The line controller 22 is connected through a telephone line to another facsimile apparatus (not shown).

This facsimile apparatus has the functions built into conventionally known facsimile apparatuses.

That is, in the normal transmission mode, the operator loads the document carrying the information to be transmitted in to the document reader 11 of the facsimile apparatus. The facsimile apparatus optically scans the document page by page at the document reader 11, converts the meaningful text, graphics, etc. to dots, performs image compression, dials up the other facsimile apparatus designated at the control panel 17 through the modem 21 and line controller 22, and, when the conditions for communication are established, sends the image compressed data to the other facsimile apparatus. When the destination facsimile apparatus is busy, the facsimile apparatus waits to redial, dials again after the elapse of a predetermined time, then, when the link has been established, sends the image compressed data to the other facsimile apparatus.

Further, when the image compressed data from the sender's facsimile apparatus is received through the line controller 22 and modem 21, the received image compressed data is expanded and the sender's image data is printed (reproduced) through the printer 16.

The signal processor 12 usually includes a microcomputer, image compression and expansion processing IC, etc. so as to perform the above-mentioned signal processing and control processing. The ROM 13 stores in it a processor operating by a microcomputer. The RAM 14 is used for temporary storage of transmission data or received data.

The facsimile apparatus is provided with an optical disk drive 19 which drives and controls the optical disk 20 which stores the image compressed data to be transmitted or stores the image compressed data received.

The optical disk cassette 20 is for example a 2.5 inch MD which can be inserted into and removed from the optical disk drive 19. Accordingly the optical disk drive 19 drives the MD.

A 2.5 inch MD has a storage capacity of about 150 MB, so when converting the text and graphics on an A4 size (296 mm×210 mm) document into image data and compressing the same, assuming that 50 KB is required per A4 size page, has a maximum storage capacity of about 3000 pages. Further, the optical disk cassette 20 is interchangeable, so when one optical disk cassette 20 becomes almost full with stored data, it can be easily replaced by an optical disk cassette with more room.

The optical disk cassette 20 can store not only the data to be transmitted, but also the received data.

The transmission image data and received image data, or one or the other, of as much as 3000 pages of A4 size documents stored in the optical disk cassette 20 can be stored as it is as compact paperless documents and thus is convenient for document management as well.

The facsimile apparatus is also provided with an image memory 15 and a display 18. The display 18 is not the small sized liquid crystal display mounted at the control panel 17, but a large-sized liquid crystal display or cathode ray tube (CRT) display able to display image data and suited to the later mentioned image retrieval.

Figure 2:
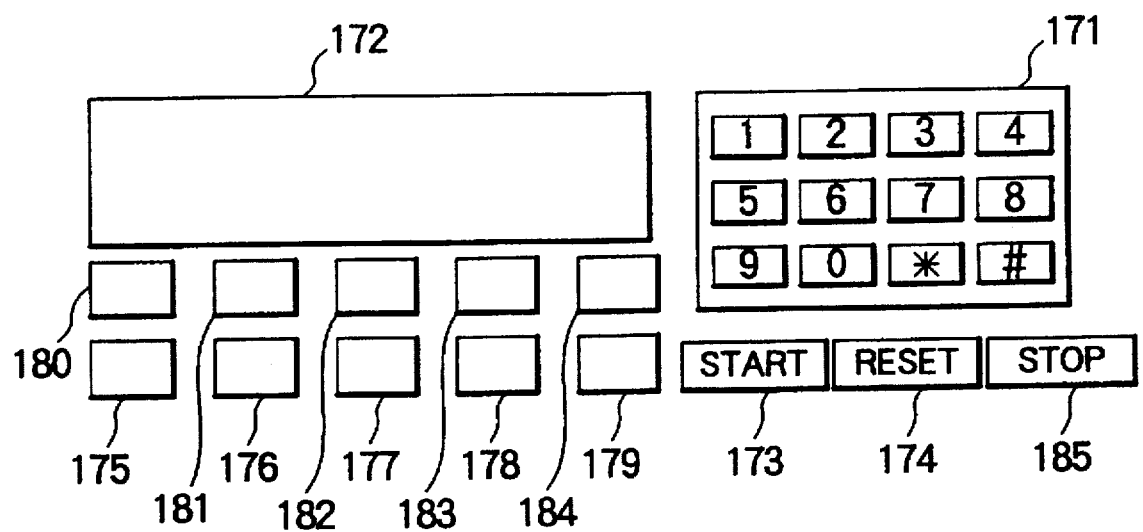
FIG. 2 is a partially detailed front view of a control panel shown in FIG. 1.

FIG. 2 is a view of the control panel 17.

The control panel 17 has a ten-key portion 171 comprised of numerical buttons etc. for setting the telephone numbers of other (destination) facsimile apparatuses, a small-sized liquid crystal display 172 for displaying the state of the facsimile apparatus, a start button 173 for instructing the start of the transmission, and a reset button 174 for resetting the set state.

The control panel 17 has a preset transmission selection switch 175. The preset transmission selection switch 175 is used when storing the content of a document in advance in the optical disk cassette 20 and sending out the stored transmission-use image compressed data at the designated date and time. In this case, the preset transmission switch 175 is depressed to designate a "preset transmission", then the ten-key portion 171 of the numerical keys is used to set the date and time of transmission. Accordingly, the ten-key portion 171 comprised of the numerical keys is used for not only setting telephone numbers of destination facsimile apparatuses, but also setting the designated (preset) time of the "preset transmission".

The control panel 17 has a transmission data storage designation switch 176 for designating that the transmission-use image compressed data be stored in the optical disk cassette 20 and that the received data storage designation switch 177 for designating that the received image compressed data be stored in the optical disk cassette 20.

The control panel 17 is provided with an alternate reception information retrieval switch 178 for retrieving the state of automatic alternate reception, a received information retrieval switch 180 for retrieving the received information stored in the optical disk cassette 20 when pressing the received data storage designation switch 177, and a transmission information retrieval switch 181 for retrieving the transmission data stored in the optical disk cassette 20 by pressing the transmission data storage designation switch 176.

The control panel 17 also has a printing switch which is used when desiring to print out the results of retrieval of the above information.

The control panel 17 further has a data erasure switch 182 for erasing the received image compressed data or the transmission image compressed data stored in the optical disk cassette 20.

The control panel 17 also has a stop button 185 for stopping the operation in process.

The control panel 17 is further provided with a switch for designating the darkness of the printing, a switch designating the precision of reading of the document, a light emitting diode (LED) showing the existence of any abnormalities, etc., but these are not shown due to reasons of space in the illustration.

In this embodiment, the number of redialings and the time interval between redialings are made constant and it is assumed that this data cannot be designated from the control panel 17.

The image memory 15 is realized by a DRAM or other semiconductor memory. For example, as proposed in Japanese Unexamined Patent Publication (Kokai) No. 2-231868, the received image compressed data is stored once, the stored content is displayed on the display 18 for confirmation of its content, or it is confirmed and then used for printing in the printer 16.

In the present invention, after confirmation on the display 18, the received data may be selectively stored in the optical disk cassette 20 through an optical disk drive 19.

Further, the image memory 15 and display 18 may be used for information retrieval.

For example, when the paper in the printer 16 runs out and a number of groups of received data have already been stored in the optical disk cassette 20 by the "automatic alternate reception" function, it is possible to refill the paper, then successively transfer the number of groups of received data from the optical disk cassette 20 to the image memory 15, display them on the display 18, retrieve the received data desired to be reproduced, and print out the same in the printer 16.

In the same way, it is possible to retrieve the information to be reproduced when storing the received data in an optical disk cassette 20, then using the facsimile apparatus shown in FIG. 1 or using another facsimile apparatus or copier or other image processing apparatus to reproduce the received data stored in the optical disk cassette 20.

The retrieved information can be selectively reproduced by loading the optical disk cassette in another facsimile apparatus having an optical disk drive in the same way as the facsimile apparatus shown in FIG. 1 or a copier or other image data processing apparatus having an optical disk drive.

The received image data stored in the optical disk cassette 20 may be stored as is as a paperless document, which is convenient for document management.

When storing a plurality of information desired to be transmitted at a preset date and time by the facsimile apparatus shown in FIG. 1 in the optical disk cassette 20 in advance (for "preset transmission"), when retrieving image data to check on the content or change the preset transmission time, it is possible to transfer the data from the optical disk cassette 20 to the image memory 15, confirm the image data, then selectively transmit the desired transmission data.

In the same way, when recording the plurality of transmission data in advance in an optical disk cassette in another facsimile apparatus different from the facsimile apparatus shown in FIG. 1 or copier or other image data input apparatus etc. and loading the optical disk cassette 20 in the facsimile apparatus shown in FIG. 1 used for the transmission, it is possible to retrieve the data desired to be transmitted by transferring the data from the optical disk cassette 20 to the image memory 15, confirm the image data to be transmitted, and selectively transmit the desired transmission data. In such a case, since it is possible to store the data in the optical disk cassette in advance in another apparatus without using the facsimile apparatus illustrated in FIG. 1 and being used for transmission, it is possible to record large quantities of document data in advance in an optical disk cassette 20, load the optical disk cassette 20 in the facsimile apparatus illustrated in FIG. 1, and use that facsimile apparatus in the middle of the night when the telephone rates are lower or in the middle of the night when the lines are not busy at all, and transmit the data stored in the optical disk cassette 20 without substantive restriction as to the page storage capacity.

The image data sent from the optical disk cassette 20 can be retained as a paperless document as it is, which is also convenient for management of documents.

In this way, if use is made of a storage medium which is small in size, low in price, exchangeable, and large in capacity, such as an optical disk cassette 20 such as an MD, various other beneficial uses become possible in addition to the conventional functions of a facsimile apparatus.

Figure 3:
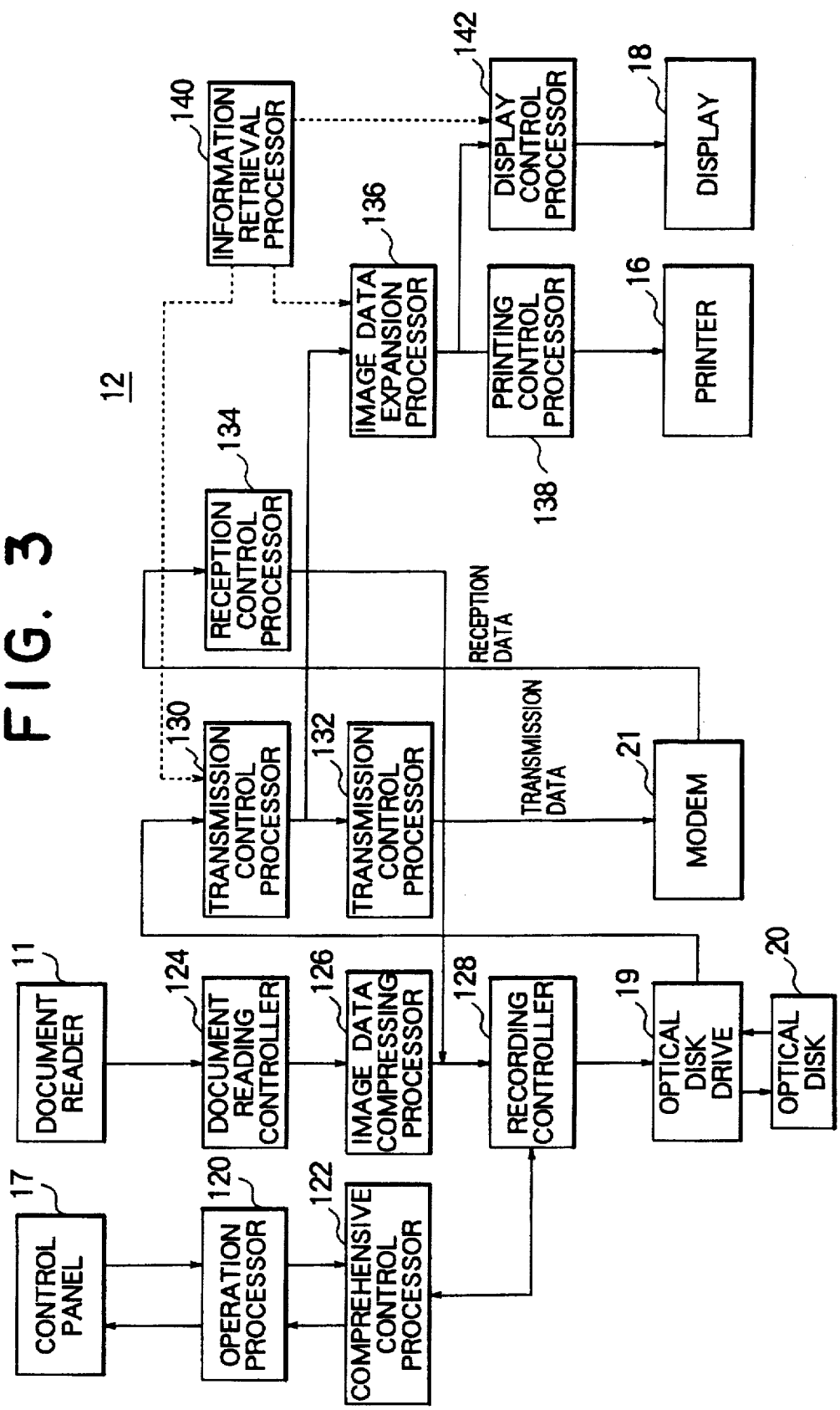
FIG. 3 is a detailed view of the configuration of the signal processor shown in FIG. 1.

FIG. 3 is a functional block diagram showing the signal processor 12 which performs the above-mentioned processing according to the processing functions.

The signal processor 12 has an operational processor 120, a comprehensive control processor 122, a document reading controller 124, an image data compressing processor 126, a recording controller 128, a reading control processor 130, a transmission control processor 132, a reception control processor 134, an image data expansion processor 136, a printing control processor 138, an information retrieval processor 140, and a display control processor 142.

The operational processor 120 works with the comprehensive control processor 122 so as to perform input processing on the input of telephone numbers of the destination facsimile apparatuses set at the control panel 17, instructions for start of transmission, etc., display the status on a liquid crystal display (not shown) provided at the control panel 17, display the confirmation of the input telephone number, give messages on erroneous operations, etc.

The comprehensive control processor 122 performs comprehensive control of the processors in the signal processor 12.

Figure 4:
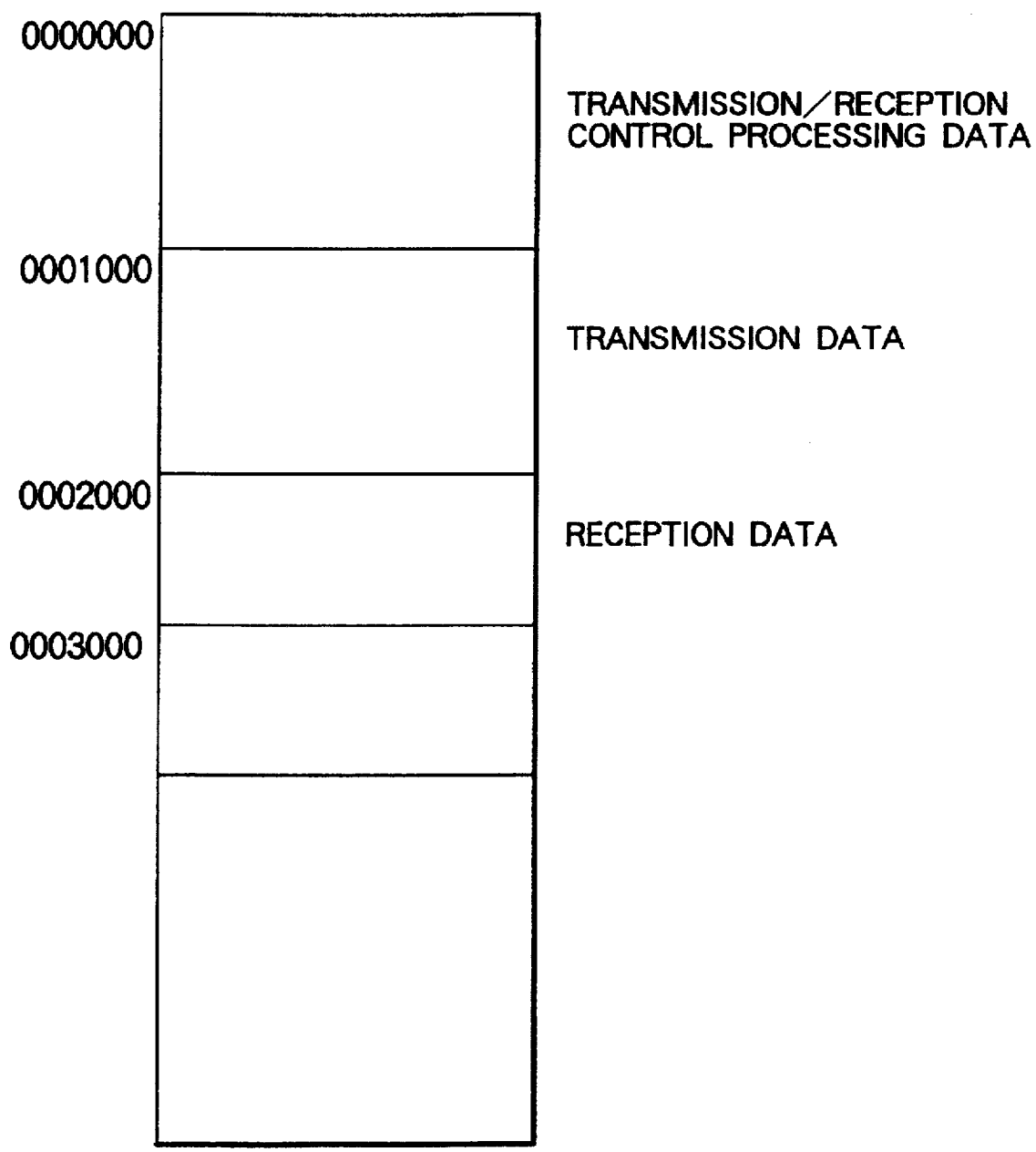
FIG. 4 is a view of the area of use of the optical disk cassette showing FIG. 1.

FIG. 4 shows an example of the use of the memory of the optical disk cassette 20.

The header portion of the optical disk cassette is used as the area for storage of the transmission and reception control data. The other portions are used as the areas for retaining the image compressed data for transmission or the received image compressed data.

In the transmission and reception control data storage area is stored the information illustrated in Table 1.

TABLE 1

| | Case of transmission while reading | Case of transmission at designated time |
|---|---|---|
| Information before transmission | | |
| Transmission code & number | 1-04-21-0001 | Same |
| Destination fax number | 03-3866-4022 | Same |
| Destination abbreviation | SOHSHIN | Same |
| Scheduled date & time of start of transmission | 0 | 1993:04:21:10:00 |
| Number of redialings | 5 | Same |
| Interval between redialings | 10 minutes | Same |
| Address of start of storage of transmission data | "0001000" | Same |
| Address of end of storage of transmission data | "0001FFF" | Same |
| Information on results of transmission | | |
| State of transmission (untransmitted:0/transmission completed (state):1 (2,3)/awaiting redialing:5/transmission failed:9) | | |
| Number of redialings | 3 | Same |
| Date and time of start of transmission | 1993:04:21:09:00 | 1993:04:21:10:00 |
| Date and time of end of transmission | 1993:04:21:09:30 | 1993:04:21:10:30 |

The control information illustrated in Table 1 shows the information before transmission and the information on the results of the transmission. The information before transmission includes:

(1) Code showing transmission: "1", day of transmission: "April 21", and number showing first transmission of that day: "0001"
(2) Telephone number of the destination facsimile apparatus
(3) Abbreviation of destination
(4) Scheduled date and time of start of transmission
(5) Number of redialings in the case where the destination facsimile apparatus is busy
(6) Interval between redialings
(7) Address of start of storage of transmission data in optical disk cassette 20 (hexadecimal indication)
(8) Address of end of storage of transmission data in optical disk cassette 20 (hexadecimal indication)

This example illustrates the case of two modes: the "transmission while reading" mode wherein a document set in the document reader 11 is read through the document reader 11, stored once in the optical disk cassette 20, and then immediately sent to the destination facsimile apparatus and the "preset transmission" where the content to be transmitted is read in advance through the document reader 11 and sent on the designated date and time.

The difference between "transmission while reading" and "preset transmission" is whether or not the date and time for the start of the transmission are set. In "transmission while reading", the date and time of the start of the transmission are equal to "0".

The information after transmission includes:

(1) State of transmission
(2) Number of redialings
(3) Date and time of actual start of transmission
(4) Date and time of actual end of transmission As the states of transmission, "0" is stored when the transmission has not yet been effected, "1" to "3" when the transmission has been completed, "5" when the facsimile apparatus is awaiting redialing, and "9" when the transmission has failed. In the case of a completed transmission, "1" shows that the transmission was normal, "2" that there was communication trouble in the transmission, and "3" that only part of the transmission could be performed and the rest of the transmission was cut off.

The operation of the facsimile apparatus in the case of "transmission while reading" illustrated in Table 1 will be explained with reference primarily to the signal processor 12 shown in FIG. 3.

The party performing the transmission processing (hereinafter referred to as the "operator") depresses the transmission data storage designation switch 176 on the control panel, not operating the preset transmission selection switch 175 of the control panel 17, presses the ten-key portion 171 comprised of numerical buttons on the control panel 17 to set the telephone number of the destination facsimile apparatus, mounts the document to be transmitted in the document reader 11, and presses the start button 173 on the control panel 17 to instruct the start of transmission. When the preset transmission selection switch 175 is not pressed, the result is "transmission while reading".

The operational processor 120 and the comprehensive control processor 122 confirm that the mode is "transmission while reading" where the preset transmission selection switch 175 is not depressed, in accordance with the operation of the operator, set the transmission code to "1", the current date of operation to "April 21", and the number of the transmission that day to "1". The thus set data is sent to the recording controller 128 and is stored through the optical disk drive 19 to the data storage area of transmission and reception processing of the optical disk cassette 20.

The operational controller 120 and the comprehensive control processor 122 record the telephone number of the destination facsimile apparatus set by the ten-key portion 171 comprised of the numerical buttons in the data storage area of the transmission and reception control processing of the optical disk cassette 20 through the recording controller 128. In this example, the destination abbreviation corresponding to the telephone number of the facsimile apparatus is recorded in advance in the RAM 14. The comprehensive control processor 122 reads out from the RAM 14 the destination abbreviation corresponding to the telephone number of the facsimile apparatus set and stores the same through the recording controller 128 in the data storage area of the transmission and reception control processing of the optical disk cassette 20.

In this example, in so far as the operator does not set the apparatus otherwise, the comprehensive control processor 122 reads out the number of redialings "5" and time interval between redialings "10 minutes" recorded in advance in the RAM 14 and records these through the recording controller 128 in the data storage area transmission and reception control processing of the optical disk cassette 20.

The above-mentioned data stored in the data storage area of the transmission and reception control processing of the optical disk cassette 20 is also stored in the RAM In response to the depression of the start button 173 on the control panel 17 instructing the start of transmission, the comprehensive control processor 122 drives the document reading controller 124, the image data compression processor 126, and the recording controller 128. The document reading controller 124 reads the document placed in the document reader 11, the image data compression processor 126 compresses the read image data, and the recording controller 128 stores the compressed image data in the transmission data storage area of the optical disk cassette 20.

As the storage and recording medium, use is made of an optical disk cassette 20, so even if the document is an extremely large 50 pages or so, the compressed image data will never be unable to be stored in the optical disk cassette 20.

When the reading of the document placed in the document reader 11 is completely finished, the comprehensive control processor 122 designates the telephone number of the destination facsimile apparatus stored in the RAM 14 and drives the transmission control processor 132. The driven transmission control processor 13 performs call originating processing for the telephone number of the destination facsimile apparatus and establishes a telephone link with the destination facsimile apparatus.

If the destination facsimile apparatus is busy and a telephone link cannot be established, the facsimile apparatus redials after 10 minutes, so the facsimile apparatus enters a state awaiting redialing. When the comprehensive control processor 122 receives a signal from the transmission control processor 132 that the apparatus is in a state awaiting redialing, the comprehensive control processor 122 records "5" in the transmission result information storage in the data storage area of the transmission and reception control processing of the optical disk cassette 20 to record the fact of the state of awaiting redialing.

When the telephone link with the destination facsimile apparatus cannot be established even after five redialings, the comprehensive control processor 122 stores the code "9" indicating transmission failure through the recording controller 128 in the data storage area of the transmission and reception control processing of the optical disk cassette 20 and prints the fact of the transmission failure through the printing control processor 138 by the printer 16. An example of the printing is shown in the following Table 2.

TABLE 2

Results of reception = 9 (5)
Time of start = 1993:04:21:10:00
Time of end = 1993:04:21:10:50

In the results of printing shown in Table 2, the results of transmission =9 (5) indicates that transmission failed on Apr. 21, 1993 when redialing every 10 minutes five times from 10:00 to 10:50.

Once a telephone link is established with the destination facsimile apparatus, the transmission control processor 132 notifies the comprehensive control processor 122 of this effect. The comprehensive control processor 122 drives the reading control processor 140 and starts the operation for reading out the compressed image data stored in the transmission data storage area of the optical disk cassette 20 in units of transmittable volumes. The compressed image data read out at the reading control processor 130 is output to the transmission control processor 132 and is sent through the modem 21 to the destination facsimile apparatus with which the telephone link has been established.

The transmission control processor 132, when processing for transmission, notifies the comprehensive control processor 122 of this effect. The comprehensive control processor 122 drives the reading control processor 130 to read out the next compressed image data. The image data read out by the reading control processor 130 is sent through the transmission control processor 132 to the destination facsimile apparatus in the same way as above.

This operation is consecutively continued until all the compressed image data finishes being transmitted.

The readout of the image data at the reading control processor 130 and the transmission of the same at the transmission control processor 132 are performed in this example in units of transmittable volumes of image data, but since the telephone link between the facsimile apparatus and the destination facsimile apparatus is maintained, the transmission of the image data continues without interruption.

The comprehensive control processor 122 judges that transmission of all of the transmission image data has ended and instructs the transmission control processor 132 to release the established telephone line. The transmission control processor 132 performs the processing for releasing the telephone line. The comprehensive control processor 122 signals the recording controller 128 to store in the transmission result information storage of the data storage area for transmission and reception control processing of the optical disk cassette 20 the code "1 " showing that the transmission has been completed without trouble, the actual date and time of the start of transmission, and the actual date and time of the end of transmission and to erase the transmission conditions stored temporarily in the RAM 14. Further, the comprehensive control processor 122 signals the printer 16 through the printing control processor 138 to print to shown that the transmission has been completed. An example of the printing is shown in the following Table 3.

TABLE 3

Results of reception = 1 (0)
Time of start = 1993:04:21:10:00
Time of end = 1993:04:21:10:15

The results of printing shown in Table 3 show that normal transmission was performed on Apr. 21, 1993 from 10:00 to 10:15 without having to wait and redial.

If for example a fault occurs in a telephone line in the middle of a transmission, the results of printing become as shown in the following Table 4. A result of transmission=2 means that the transmission was completed, but that an abnormality occurred in the telephone line in the middle of it.

TABLE 4

Results of reception = 2 (0)
Time of start = 1993:04:21:10:00
Time of end = 1993:04:21:10:10

In this way, even when a transmission has been completed, the data storage area for transmission and reception control processing of the optical disk cassette 20 stores the transmission conditions before transmission and the actual results of transmission and, further, the transmission data storage area stores the compressed image data, so it is possible to remove the optical disk cassette 20 from the facsimile apparatus and store the same as a paperless document showing the results of transmission.

Above, the explanation was made with reference to the "transmission while reading" operation shown in Table 1. The "preset transmission" operation is the same as the "transmission while reading" except that the operator presses the preset transmission selection switch 175, then sets the date and time of start of the transmission through the ten-key portion 171 comprised of the numerical buttons on the control panel 17, that the set date and time are stored in the data storage area of the transmission and reception control processing of the optical disk cassette 20 and are stored in the RAM 14, and that the comprehensive control processor 122 performs the above-mentioned reading processing and transmission processing when the set date and time arrive.

That is, the reading of the document set in the document reader 11 and the storage in the optical disk cassette 20 are started at the time when the start button 173 on the control panel 17 instructing the start of the transmission is pressed and that the above-mentioned transmission operation is performed when the date and time stored in the optical disk cassette 20 are reached.

The above operation shows an example of the case of storing the transmission data in the optical disk cassette 20, but when the operator does not press the transmission data storage designation switch 176 on the control panel 17, in the "transmission while reading" mode where the preset transmission selection switch 175 is not pressed, the transmission data is subjected to transmission processing without being stored in the optical disk cassette 20, while in the "preset transmission" mode where the preset transmission selection switch 175 is pressed, the information before transmission and the transmission data are stored in the optical disk cassette 20 until the designated date and time are reached, but the after the transmission is completed, the stored information before transmission and transmission date and time are erased from the optical disk cassette 20.

Next, an explanation will be given of the reception operation.

If the operator sets the "normal reception mode" without pressing the received data storage designation switch 177 on the control panel 17, the image data received through the modem 21 and the reception control processor 134 is expanded by the image data expansion processor 136 and reproduced through the printing control processor 138 from the printer 16.

In this reproduction processing, the results of reception, for example, the telephone number of the other facsimile apparatus, the date and time of the start of the reception, and the date and time of the end of the reception, are stored in the optical disk cassette 20 in the manner shown in Table 5 below. The results of storage may be printed as shown in Table 6.

TABLE 5

| Information on results of reception | Case of normal reception | Case of reception while |
|---|---|---|
| Reception code & number | 2-04-21-0001 | Same |
| Sender fax number | 03-3866-4022 | Same |
| Sender abbreviation | SOHSHIN | Same |
| State of reception (reception completed/ reception failed) | 1 (2, 3)/9 | Same |
| Date and time of start of transmission | 1993:04:21:15:00 | Same |
| Date and time of end of transmission | 1993:04:21:15:20 | Same |
| Address of start of storage of transmission data | 0 | "0003000" |
| Address of end of storage of transmission data | 0 | "0003FFF" |

TABLE 6

Results of reception = 1 (0) 2-04-21-0001
Reception mode = 03-3866-4012
Time of start = 1993:04:21:15:00
Time of end = 1993:04:21:15:20

When the operator presses the received data storage designation switch 177 on the control panel 17 to set the "storage reception mode", the image data received through the modem 21 and the reception control processor 134 is stored by storing the state of reception as shown in the right side of Table 5 through the recording controller 128 in the empty area of the data storage area of transmission and reception control processing of the optical disk cassette 20 and storing the received compressed image data in the received data area (empty area following transmission data storage area). The compressed image data received at the image data expansion processor 136 is reproduced from the printer 16 as shown in the following Table 7 through the printing control processor 138.

Since the received image data is stored in the optical disk cassette 20, the optical disk cassette 20 can be considered as a paperless document.

TABLE 7

Results of reception = 1 (0) 2-04-21-0001
Reception mode = 03-3866-4012
Time of start = 1993:04:21:15:00
Time of end = 1993:04:21:15:20
Address of storage of reception data = "0003000" to "0003FFF"

Even when the paper in the printer 16 runs out and the "automatic alternate reception" mode is entered, like with the above-mentioned storage reception mode, the received data is stored in the optical disk cassette 20 and the comprehensive control processor 122 displays the existence of the alternate reception on the small-sized liquid crystal display 172 on the control panel 17 or not shown status indication lamp (LED).

The optical disk cassette 20 has a sufficient storage capacity, so even when performing alternate reception several times and even when a massive amount of data is received, the data can be stored on the optical disk cassette 20 without loss.

When the operator confirms the existence of the alternate reception, refills the printing paper, and presses the alternate reception information retrieval switch 178 on the control panel 17, the comprehensive control processor 122 operates through the operational processor 120 and drives the information retrieval processor 140.

The information retrieval processor 140 successively reads out the alternate-reception received data stored in the optical disk cassette 20 through the reading control processor 130 in the order received and displays (reproduces) the same on the display control processor 142 through the image data expansion processor 136.

When the operator confirms the reproduced data displayed on the display control processor 142 and wishes to print it out, he instructs printing of that received data by pressing the printing switch 179 of the control panel 17. When there is a printing instruction, the comprehensive control processor 122 drives the reading control processor 130, the image data expansion processor 136, and the printing control processor 138 to make the retrieved received data be printed by the printer 16.

When the operator wishes to store the received data retrieved and displayed on the display 18, before moving to the retrieval of the alternate reception data, he turns off the received data storage designation switch 177 of the control panel 17 once, then turns it on again. If moving to the retrieval of the next alternate reception data before this operation, the comprehensive control processor 12 would automatically erase the received data which had been stored in the optical disk cassette 20.

The information retrieval is possible not only for the above-mentioned automatic alternate reception image data, but for all data stored in the optical disk cassette 20.

In this case, the operator presses the received information retrieval switch 180 and the transmission information retrieval switch 181 on the control panel 17. The comprehensive control processor 122 then drives the information retrieval processor 140 in response to this switch operation and causes the stored data to be reproduced on the display 18 in the order stored in the optical disk cassette 20.

The printing of the data displayed on the display 18 by the printer 16 and the erasure or storage of the printed data are, like the above, designated by whether or not pressing the data erasure switch 182 of the control panel 17 before moving to the next retrieval.

The optical disk cassette 20 loaded in the optical disk drive 19 of the facsimile apparatus shown in FIG. 1 may be exchanged (removed).

Therefore, in the facsimile apparatus shown in FIG. 1, the transmitted or received data may be retrieved or printed out by loading the optical disk cassette 20 in even another facsimile apparatus having a similar configuration as the facsimile apparatus shown in FIG. 1.

Further, by storing the transmission data in advance in an optical disk cassette 20 using a facsimile apparatus having a similar configuration to the facsimile apparatus shown in FIG. 1 and loading that optical disk cassette 20 into the facsimile apparatus shown in FIG. 1, it is similarly also possible to sent the transmission data stored (recorded) in advance from the facsimile apparatus shown in FIG. 1.

Still further, the above-mentioned advanced storage of the transmission data in the optical disk cassette 20 and the reproduction of the transmission data and received data stored in an optical disk cassette 20 may be performed by an image data processing apparatus not having the modem 21, line controller 22, and other communication circuits of the facsimile apparatus shown in FIG. 1, for example, a copier.

Figure 5:
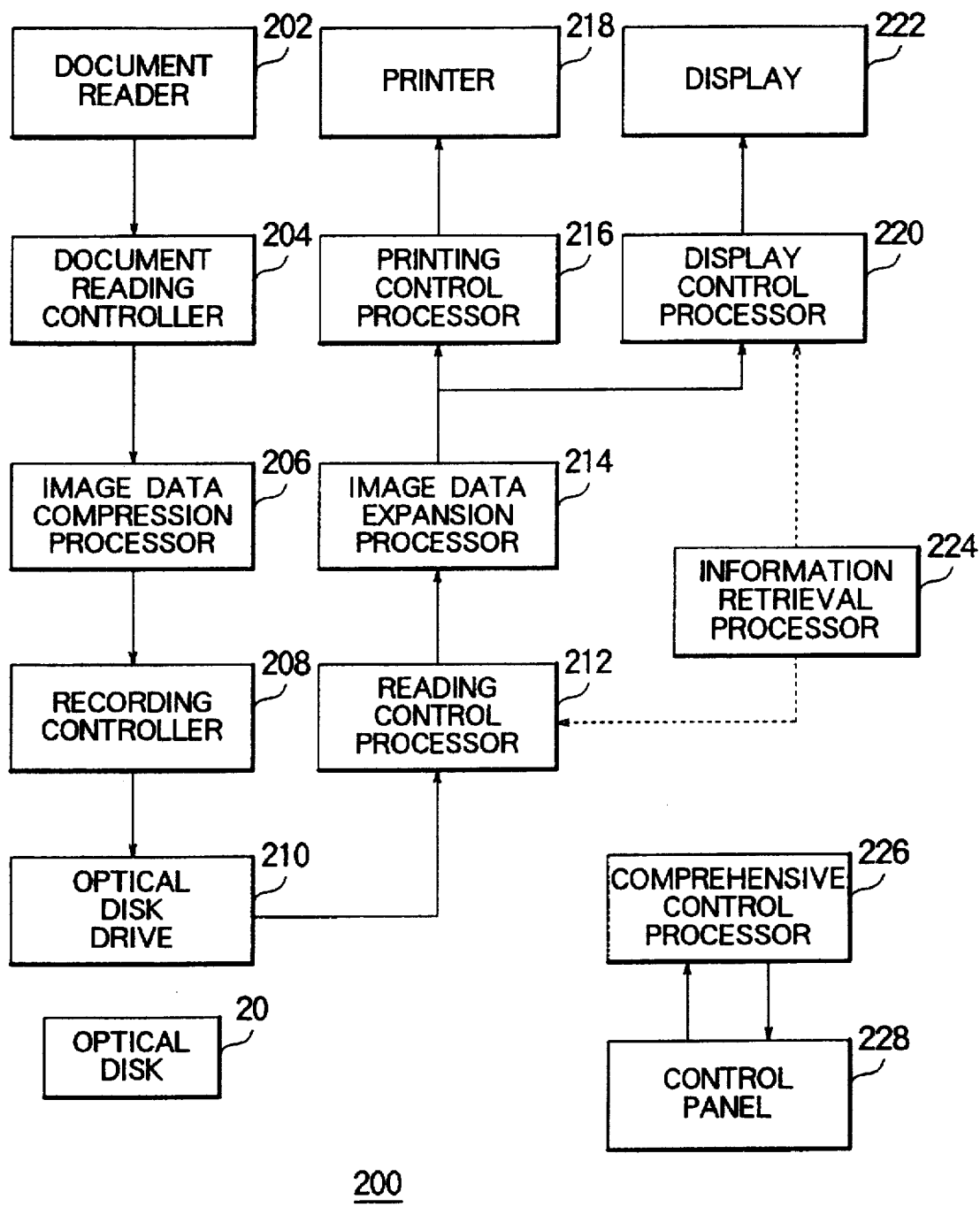
FIG. 5 is a view of the configuration of an information storage and output processing apparatus.

The configuration of a copier used as an image data processing apparatus or another facsimile apparatus or other information storage and output processing apparatus 200 is shown in FIG. 5.

This information storage and output processing apparatus 200 is provided with a document reader 202 corresponding to the document reader 11 shown in FIG. 1 and FIG. 2, a document reading controller 204 corresponding to the document reading controller 124, an image data compression processor 206 corresponding to the image data compression processor 126, a recording controller 208 corresponding to the recording controller 128, and an optical disk drive 210 able to drive the optical disk cassette 20 corresponding to the optical disk drive 19. A copier which stores image data on a floppy disk is known, so the above-mentioned configuration can be easily achieved by using an optical disk drive 210 instead of a floppy disk drive.

The information storage and output processing apparatus 200 is further provided with a reading control processor 212 corresponding to the reading control processor 130 shown in FIG. 1 and FIG. 2, an image data expansion processor 214 corresponding to the image data expansion processor 136, a printing control processor 216 corresponding to the printing control processor 138, and a printer 218 corresponding to the printer 16.

When the information storage and output processing apparatus 200 is a copier, the printing control processor 216 and the printer 218 used may be the printer of the copier.

The information storage and output processing apparatus 200 further is provided with an information retrieval processor 224 corresponding to the information retrieval processor 140 shown in FIG. 1 and FIG. 2, a display control processor 220 corresponding to the display control processor 142, and a display 222 corresponding to the display 18.

Further, the information storage and output processing apparatus 200 is provided with a control panel 228 corresponding to the control panel 17 shown in FIG. 1 and FIG. 2 and a comprehensive control processor 226 corresponding to the comprehensive control processor 122. This apparatus 200 has a configuration in which the operational processor 120 shown in FIG. 1 and FIG. 2 is incorporated into the comprehensive control processor 226.

In this way, by incorporating the circuit shown in FIG. 1 into a copier or other image data processing apparatus, it is possible to use the functions of the copier and at the same time store transmission data through a facsimile apparatus or reproduced stored data. In other words, it is possible to use the optical disk cassette 20 effectively as a paperless document. In particular, as mentioned above, an optical disk cassette 20 is small in size, interchangeable, and low in price and is perfect for large volume data storage, so the practical effects of using an optical disk cassette 20 as a means of storage for paper documents are tremendous.

Another embodiment of the present invention will be explained with reference to Table 8.

This example shows the case where transmission is made possible to the telephone number 03-3866-4012 of a second alternate destination facsimile apparatus when the telephone number 03-3866-4022 is designated as the first destination facsimile apparatus, but a telephone connection cannot be established with the first facsimile apparatus even after five redialings or when the paper of the first facsimile apparatus has run out and transmission cannot be completed.

TABLE 8

|  | Case of transmission while reading | Case of transmission at designated time |
|---|---|---|
| Information before transmission |  |  |
| Transmission code & number | 1-04-21-0001 | Same |
| Destination fax number | 03-3866-4022 | Same |
| Destination abbreviation | SOHSHIN | Same |
| Scheduled date & time of start of transmission | 0 | 1993:04:21:10:00 |
| Number of redialings | 5 | Same |
| Interval between redialings | 10 minutes | Same |
| Alternative destination tax number | 03-3W-4012 | Same |
| Alternative destination abbreviation | SOHSHIN | Same |
| Address of start of storage of transmission data | "0001000" | Same |
| Address of end of storage of transmission data | "0001FFF" | Same |
| Information on results of transmission |  |  |
| Destination fax number | 03-3866-4012 | Same |
| State of transmission (untransmitted:0/transmission completed:1/awaiting redialing:2/transmission failed:9) |  |  |
| Number of redialings | 3 | Same |
| Date and time of start of transmission | 1993:04:21:10:00 | 1993:04:21:15:00 |
| Date and time of end of transmission | 1993:04:21:10:50 | 1993:04:21:15:50 |

As shown in Table 8, the transmission shows that the transmission was performed after redialing the second facsimile apparatus twice.

Since an optical disk cassette 20 is used, there is no problem with the storage capacity, so it is possible to easily add additional information in this way.

The telephone number of the second destination facsimile apparatus is set through the control panel 17.

A further embodiment of the present invention will be explained with reference to the following Table 9.

This example shows the information enabling automatic transmission of the same transmission data to two different facsimile apparatuses.

The telephone numbers of the two facsimile apparatuses are set by the control panel 17 through consecutive input of two different numbers. These telephone numbers are stored in the optical disk cassette 20.

TABLE 9

|  | Case of transmission while reading | Case of transmission at designated time |
|---|---|---|
| Information before transmission |  |  |
| Transmission code & number | 1-04-21-0001 | Same |
| 1st destination fax number | 03-3866-4022 | Same |
| 1st destination abbreviation | SOHSHIN | Same |
| Scheduled date & time of start of transmission | 0 | 1993:04:21:10:00 |
| Number of redialings | 5 | Same |
| Interval between redialings | 10 minutes | Same |
| 2nd destination fax number | 03-3866-4912 | Same |
| 2nd destination abbreviation | SOHSHIN | Same |
| Scheduled date & time of start of transmission | 0 | 1993:04:21:20:00 |
| Number of redialings | 5 | Same |
| Interval between redialings | 10 minutes | Same |
| Address of start of storage of transmission data | "0001000" | Same |
| Address of end of storage of transmission data | "0001FFF" | Same |
| Information on results of transmission |  |  |
| 1st destination |  |  |
| State of transmission (untransmitted:0/transmission completed (state):1 (2,3)/awaiting redialing:5/transmission failed:9) | 0303866-4022 |  |
| Number of redialings | 3 | Same |
| Date and time of start of transmission | 1993:04:21:15:00 | 1993:04:21:10:00 |
| Date and time of end of transmission | 1993:04:21:15:30 | 1993:04:21:10:50 |
| 2nd destination |  |  |
| State of transmission (untransmitted:0/transmission completed (state):1 (2,3)/awaiting redialing:5/transmission failed:9) | 03-3866-4012 | Same |
| Number of redialings | 3 | Same |
| Date and time of start of transmission | 1993:04:21:15:00 | 1993:04-21:10:00 |
| Date and time of end of transmission | 1993:04:21:15:30 | 1993:04:21:10:30 |

The facsimile apparatus transmits to the first facsimile apparatus, then stores the results of transmission in the optical disk cassette 20, then transmits to the second facsimile apparatus and stores the results of that transmission in the optical disk cassette 20.

In this case too, the optical disk cassette 20 is used, so there is in practice no limit on the storage capacity and it is possible to transmit the same transmission data to two or more facsimile apparatuses.

The transmission data and the telephone number of the destination facsimile apparatus shown in this embodiment may of course be set in the optical disk cassette 20 not only with the facsimile apparatus used for the transmission, but also for other facsimile apparatuses not used directly for the transmission or the image data processing apparatus illustrated in FIG. 5.

In this embodiment, it is also possible to add the setting of the above-mentioned automatic alternate destination facsimile apparatus.

In this way, if use is made of an optical disk cassette, such as an MD, which is small in size, low in cost, exchangeable, and large in capacity, as the optical storage medium, various other beneficial uses become possible in addition to the functions of a conventional facsimile apparatus.

That is, since use is made of an optical recording medium with a large storage capacity, for example it is possible to store image data without restricting to storage of image data sent from a facsimile apparatus or received by a facsimile apparatus.

Further, since use is made of an optical recording medium which is small in size, it is possible to easily build the optical disk medium into the facsimile apparatus or other image data processing apparatuses.

Also, since use is made of an optical recording medium which is interchangeable, for example, it is possible to store image data in the optical disk medium in advance by another facsimile apparatus other than the transmission facsimile apparatus, a copier, or other image data processing apparatus, etc. and then later load that optical disk medium into a transmission facsimile apparatus and send out that data.

In the same way, when image compressed data is received by one facsimile apparatus, it is possible to reproduce the received image compressed data at another facsimile apparatus, copier, or other image data processing apparatus in addition to the receiving facsimile apparatus.

What is claimed is:

1. A facsimile apparatus comprising:
   a document reading means for reading a document image and outputting image data;
   an image compressing means for compressing the amount of data of the image data and obtaining image compressed data;
   a transmission control information generating means for generating transmission control information relating to transmission of the image compressed data;
   mode selection means for selecting a first transmission mode in which the image compressed data and the transmission control information are stored on an optical disk or a second transmission mode in which the image compressed data and the transmission control information are not stored on the optical disk;
   an optical disk storage means for storing, when the first transmission mode is selected, the image compressed data and the transmission control information on the optical disk;
   a transmitting means for transmitting the image compressed data; and
   a control means for causing, when the first transmission mode is selected, the image compressed data stored on the optical disk to be supplied to the transmitting means in accordance with the transmission control information stored on the optical disk, and for causing, when the second transmission mode is selected, the image compressed data obtained by said image compressing means to be supplied to the transmitting means in accordance with the transmission control information generated by said transmission control information generating means.

2. A facsimile apparatus according to claim 1, wherein said optical storage means stores information on results of transmission of the image compressed data.

3. A facsimile apparatus according to claim 2, wherein said information on the results of transmission is the time of transmission of the image compressed data.

4. A facsimile apparatus according to claim 2, wherein said information on the results of transmission is the time of start of the transmission and time of end of the transmission of the image compressed data.

5. A facsimile apparatus according to claim 2, wherein said information on the results of transmission shows the existence of abnormalities in the telephone line transmitting the image compressed data.

6. A facsimile apparatus according to claim 2, wherein said information on the results of transmission shows the number of redialings.

7. A facsimile apparatus according to claim 1, wherein said information on the results of transmission is the time of transmission of the image compressed data.

8. A facsimile apparatus according to claim 1, wherein said information on the results of transmission is the time of start of transmission and time of end of transmission of the image compressed data.

9. A facsimile apparatus according to claim 1, wherein said information on the results of transmission is information showing the time interval between redialings.

10. A facsimile apparatus according to claim 1, further comprising a designated time selecting means for setting a time of transmission of the image compressed data and
    wherein said control means causes the image compressed data to be read out from said optical disk storage means and supplied to said transmitting means when the set transmission time has arrived.

11. A facsimile apparatus according to claim 1, wherein said optical disk is removable from said facsimile apparatus.

12. A facsimile apparatus according to claim 1, wherein said optical disk is removable from said facsimile apparatus and a second optical disk is loadable into said facsimile apparatus, said second optical disk having stored thereon image compressed data and transmission control information; and said control means is operable to cause the image compressed data stored on the second optical disk to be supplied to the transmitting means in accordance with the transmission control information stored on the second optical disk.

13. A facsimile apparatus comprising:
    a document reading means for reading a document image and outputting image data;
    an image compressing means for compressing the amount of data of the image data and obtaining image compressed data;
    a transmission control information generating means for generating transmission control information relating to transmission of the image compressed data;
    a transmitting means for transmitting the image compressed data;
    a receiving means for receiving the image compressed data;
    a reception result detecting means for detecting results of reception in the receiving means and obtaining information on the results of reception;
    an optical disk storage means for storing the image compressed data, the transmission control information, and the information on the results of the reception in an optical disk and
    a control means for causing the image compressed data stored on the optical disk to be supplied to the transmitting means in accordance with the transmission control information stored in the optical disk and for causing the image compressed data and the information on the results of reception to be stored in the optical disk storage means at the time of reception.

14. A facsimile apparatus according to claim 13, further comprising a transmission result detecting means for detecting the results of transmission by the transmitting means and obtaining information on the results of transmission.

15. A facsimile apparatus according to claim 14, wherein said information on the results of transmission is the time of transmission of the image compressed data.

16. A facsimile apparatus according to claim 14, wherein said information on the results of transmission is the time of start of the transmission and time of end of the transmission of the image compressed data.

17. A facsimile apparatus according to claim 14, wherein said information on the results of transmission shows the existence of abnormalities in the telephone line transmitting the image compressed data.

18. A facsimile apparatus according to claim 14, wherein said information on the results of transmission shows the number of redialings.

19. A facsimile apparatus according to claim 13, wherein said information on the results of transmission is the time of transmission of the image compressed data.

20. A facsimile apparatus according to claim 13, wherein said information on the results of transmission is the time of start of transmission and time of end of transmission of the image compressed data.

21. A facsimile apparatus according to claim 13, wherein said information on the results of transmission is information showing the time interval between redialings.

22. A facsimile apparatus according to claim 13, further comprising a designated time selecting means for setting a time of transmission of the image compressed data, and wherein said control means causes the image compressed data to be read out from said optical disk storage means and supplied to said transmitting means when the set transmission time has arrived.

23. A facsimile apparatus according to claim 13, wherein said optical disk is removable from said facsimile apparatus.

* * * * *